(12) United States Patent
Martinez et al.

(10) Patent No.: US 9,020,960 B2
(45) Date of Patent: Apr. 28, 2015

(54) SYSTEM AND METHOD FOR MODELING RELATIONSHIPS BETWEEN ENTITIES

(71) Applicant: Yahoo! Inc., Sunnyvale, CA (US)

(72) Inventors: Ronald Martinez, San Francisco, CA (US); Marc Eliot Davis, San Francisco, CA (US); Christopher William Higgins, Portland, OR (US); Joseph James O'Sullivan, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 65 days.

(21) Appl. No.: 13/777,739

(22) Filed: Feb. 26, 2013

(65) Prior Publication Data

US 2014/0067875 A1 Mar. 6, 2014

Related U.S. Application Data

(63) Continuation of application No. 13/589,786, filed on Aug. 20, 2012, now Pat. No. 8,386,499, which is a continuation of application No. 12/059,594, filed on Mar. 31, 2008, now Pat. No. 8,271,506.

(51) Int. Cl.
*G06F 17/30* (2006.01)
*G06F 7/00* (2006.01)

(52) U.S. Cl.
CPC .... *G06F 17/30292* (2013.01); *G06F 17/30702* (2013.01)

(58) Field of Classification Search
CPC .......... G06F 17/3089; G06F 17/30861; G06Q 10/10; G06Q 30/0222
USPC ........................ 707/999, 104.1, 802, 755, 758
See application file for complete search history.

(56) References Cited

U.S. PATENT DOCUMENTS

| | | | |
|---|---|---|---|
| 2004/0203909 A1* | 10/2004 | Koster | 455/456.1 |
| 2008/0046298 A1* | 2/2008 | Ben-Yehuda et al. | 705/6 |
| 2009/0012841 A1* | 1/2009 | Saft et al. | 705/10 |
| 2009/0171939 A1* | 7/2009 | Athsani et al. | 707/5 |

* cited by examiner

*Primary Examiner* — Kuen Lu
(74) *Attorney, Agent, or Firm* — James J. DeCarlo; Greenberg Traurig, LLP

(57) ABSTRACT

The disclosure describes systems and methods for modeling relationships between entities on a network using data collected from a plurality of communication channels including social data, spatial data, temporal data and logical data within a W4 Network. The W4 Network personalizes and automates sorting, filtering and processing of W4COMN communications delivered or requested to be delivered using personalized value-based ranking and encoding of data, which is modeled from the point-of-view (POV) of any specific user, topic or node in the W4 Distributed graph. POV modeling supplies comparative value services to users which entails individuated data models to be aggregated and used in customization and personalization forecasting for each user and their associated data management needs.

20 Claims, 10 Drawing Sheets

US 9,020,960 B2

SYSTEM AND METHOD FOR MODELING RELATIONSHIPS BETWEEN ENTITIES

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY

This disclosure describes systems and methods for using data collected and stored by multiple devices on a network in order to improve the performance of the services provided via the network. In particular, the disclosure describes systems and methods for identifying related communications and storing information about those communications into a single information object (IO), instead of storing a separate IO for each communication. In one application, the systems and methods can be used to dynamically identify and describe events based on information received from independent communications over disparate communication channels by correlating information known about each communication, its sender and its recipient(s).

One aspect of the disclosure is a method for modeling relationships comprising identifying a first real world entity (RWE) having a first information object (IO) associated therewith that defines a state of the first RWE, and a second information object associated with the first RWE that defines a state of a second RWE. A third information object associated with the second RWE is identified that defines a state of the second RWE. A fourth information object associated with the second RWE is also identified that defines a state of the first RWE. In response to a request for state information about the first RWE from a perspective of the second RWE, the fourth information object is analyzed. The second information object is analyzed in response to a request for state information about the second RWE from a perspective of the first RWE. The first information object is analyzed in response to a request for state information about the first RWE from a perspective of the first RWE, and in response to a request for state information about the second RWE from a perspective of the second RWE the third information object is also analyzed.

Another aspect of the disclosure is a computer-readable medium encoding instructions for performing a method for modeling relationships comprising identifying a first real world entity (RWE) having a first information object (IO) associated therewith that defines a state of the first RWE, and a second information object associated with the first RWE that defines a state of a second RWE. A third information object associated with the second RWE is identified that defines a state of the second RWE. A fourth information object associated with the second RWE is also identified that defines a state of the first RWE. In response to a request for state information about the first RWE from a perspective of the second RWE, the fourth information object is analyzed. The second information object is analyzed in response to a request for state information about the second RWE from a perspective of the first RWE. The first information object is analyzed in response to a request for state information about the first RWE from a perspective of the first RWE, and in response to a request for state information about the second RWE from a perspective of the second RWE the third information object is also analyzed.

In yet another aspect, the disclosure describes a system for modeling relationships comprising a correlation engine connected via at least one communication channel to a plurality of computing devices transmitting information objects (IOs) over the at least one communication channel. Computer-readable media is connected to the correlation engine which stores social data, spatial data, temporal data and logical data associated with a plurality of real-world entities (RWEs) including the plurality of computing devices. A point-of-view (POV) relationship identification engine identifies relationships of the RWEs via determinations based upon analyses of W4 data that imply POV relationships in view of correlations made by the correlation engine.

These and various other features as well as advantages will be apparent from a reading of the following detailed description and a review of the associated drawings. Additional features are set forth in the description that follows and, in part, will be apparent from the description, or can be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the disclosure as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Figure 1:
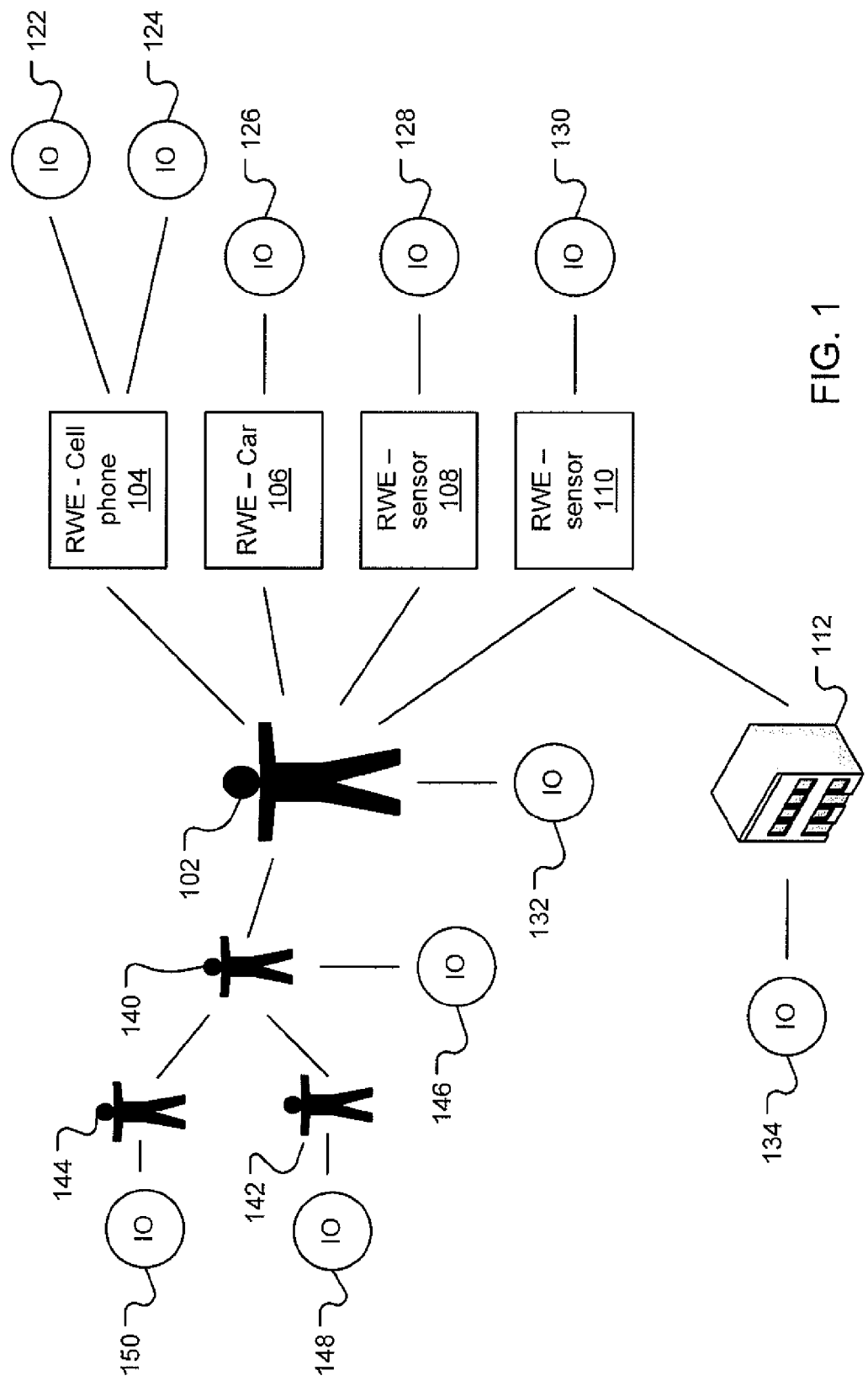
FIG. 1 illustrates an example of the relationships between RWEs and IOs on the W4 COMN.

This disclosure describes a communication network, referred herein as the "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built must first be introduced, real-world entities and information objects. These distinction are made in order to enable correlations to be made from which relationships between electronic/logical objects and real objects can be determined. A real-world entity (RWE) refers to a person, device, location, or other physical thing known to the W4 COMN. Each RWE known to the W4 COMN is assigned or otherwise provided with a unique W4 identification number that absolutely identifies the RWE within the W4 COMN.

RWEs can interact with the network directly or through proxies, which can themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that can be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations can not be considered separately from the physical device.

Examples of RWEs that must use proxies to interact with W4 COMN network include all non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that must use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMM. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is ray home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

An information object (IO), on the other hand, is a logical object that stores, maintains, generates, serves as a source for or otherwise provides data for use by RWEs and/or the W4 COMN. IOs are distinct from RWEs in that IOs represent data, whereas RWEs can create or consume data (often by creating or consuming IOs) during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

An IO in the W4 COMN can be provided a unique W4 identification number that absolutely identifies the IO within the W4 COMN. Although data in an IO can be revised by the act of an RWE, the IO remains a passive, logical data representation or data source and, thus, is not an RWE.

For every IO there are at least three classes of associated RWEs. The first is the RWE who owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the IO for some purpose.

"Available data" and "W4 data" means data that exists in an IO in some form somewhere or data that can be collected as needed from a known IO or RWE such as a deployed sensor. "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates an example of the relationships between RWEs and IOs on the W4 COMN. In the embodiment illustrated, a user 102 is a RWE of the network provided with a unique network ID. The user 102 is a human that communicates with the network via the proxy devices 104, 106, 108, 110 associated with the user 102, all of which are RWEs of the network and provided with their own unique network ID. Some of these proxies can communicate directly with the W4 COMN or can communicate with the W4 COMN via IOs such as applications executed on or by the device.

As mentioned above the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102. For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can also be directly associated with other people, such as the person 140 shown, and then indirectly associated with other people 142, 144 through their associations as shown. Again, such associations can be explicit (e.g., the user 102 can have identified the associated person 140 as his/her father, or can have identified the person 140 as a member of the user's social network) or implicit (e.g., they share the same address).

Tracking the associations between people (and other RWEs as well) allows the creation of the concept of "intimacy": Intimacy being a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

Each RWE 102, 104, 106, 108, 110, 112, 140, 142, 144 of the W4 COMN can be associated with one or more IOs as shown. Continuing the examples discussed above, FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

Furthermore, those RWEs which can only interact with the W4 COMN through proxies, such as the people 102, 140, 142, 144, computing devices 104, 106 and location 112, can have one or more IOs 132, 134, 146, 148, 150 directly associated with them. An example includes IOs 132, 134 that contain contact and other RWE-specific information. For example, a person's IO 132, 146, 148, 150 can be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of a person's IO 132, 146, 148, 150 includes remote applications through which a person can communicate with the W4 COMN such as an account with a web-based email service such as Yahoo! Mail. The location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary. Metadata is loosely defined as data that describes data. For example, given an IO such as a music file, the core, primary or object data of the music file is the actual music data that is converted by a media player into audio that is heard by the listener. Metadata for the same music file can include data identifying the artist, song, etc., album art, and the format of the music data. This metadata can be stored as part of the music file or in one or more different IOs that are associated with the music file or both. In addition, W4 metadata for the same music file can include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
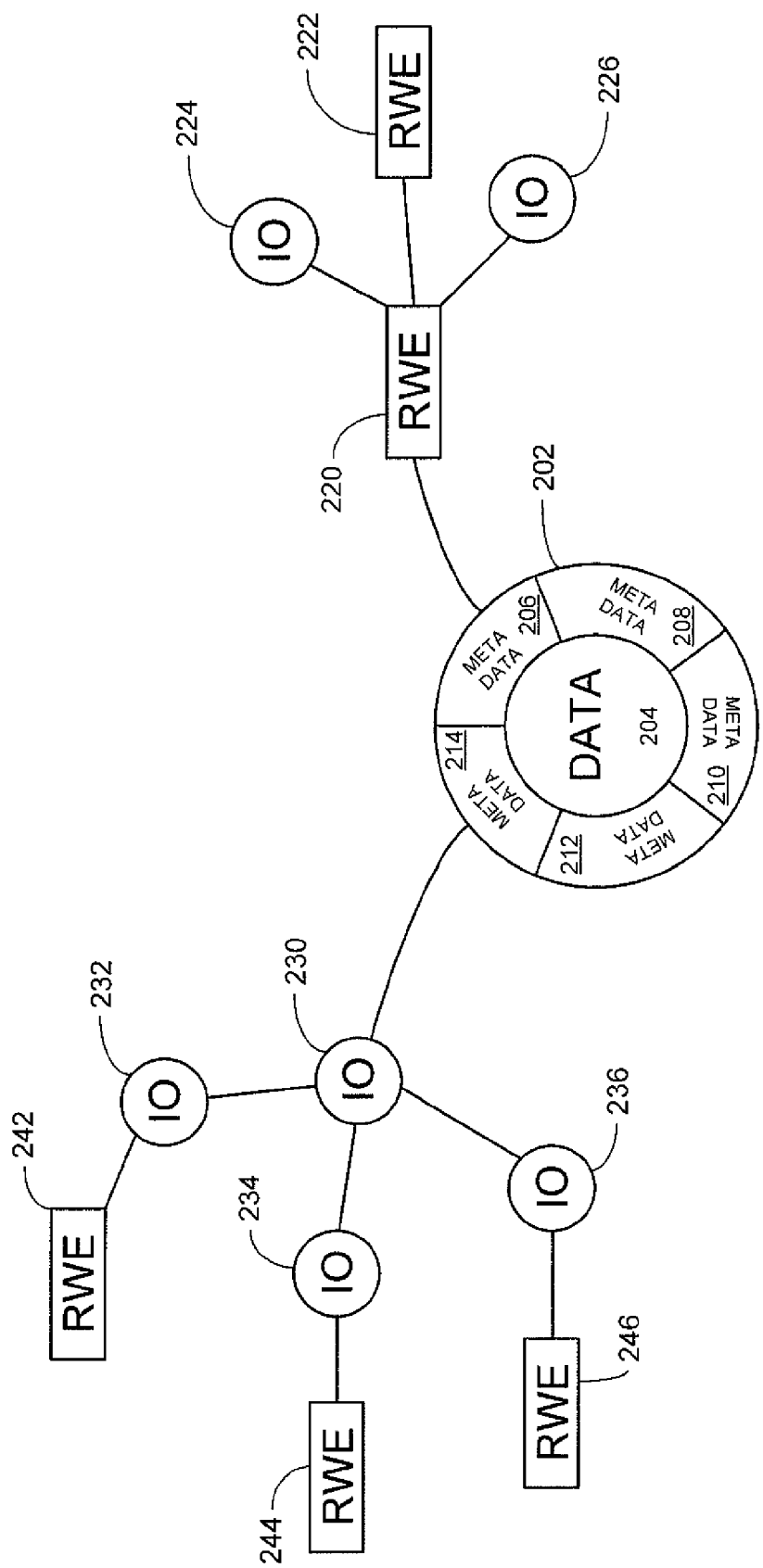
FIG. 2 illustrates an example of metadata defining the relationships between RWEs and IOs on the W4 COMN.

FIG. 2 illustrates an example of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IQs 224, 226 and a second RWE 222 based on some information known to the W4 COMN. This part of FIG. 2, for example, could describe the relations between a picture (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
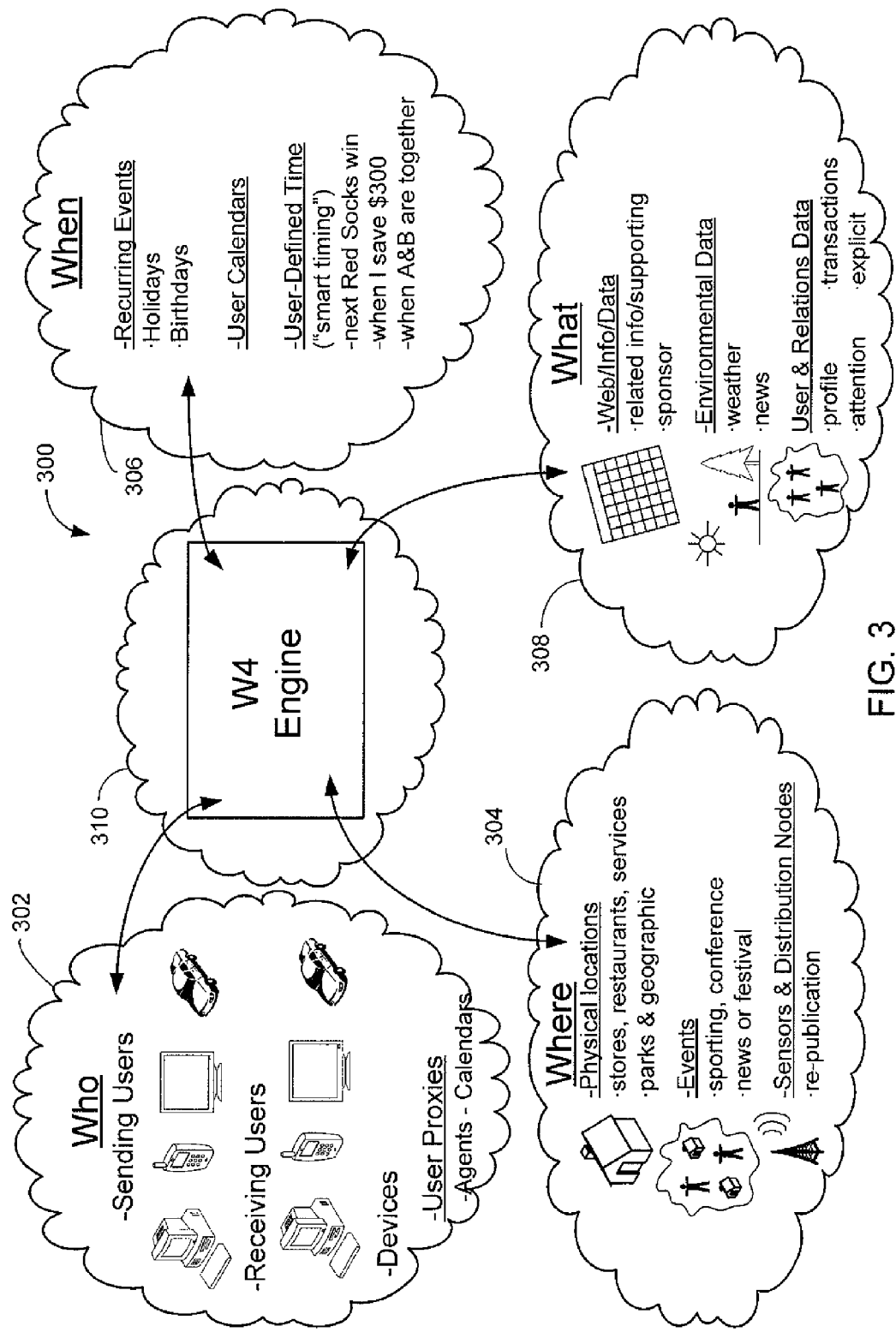
FIG. 3 illustrates a conceptual model of the W4 COMN.

FIG. 3 illustrates a conceptual model of the W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs). The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

As this is just a conceptual model, it should be noted that some entities, sensors or data will naturally exist in multiple clouds either disparate in time or simultaneously. Additionally, some IOs and RWEs can be composites in that they combine elements from one or more clouds. Such composites can be classified or not as appropriate to facilitate the determination of associations between RWEs and IOs. For example, an event consisting of a location and time could be equally classified within the When cloud 306, the What cloud 308 and/or the Where cloud 304.

The W4 engine 310 is center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). The W4 engine 310 controls all interactions between each layer of the W4 COMN and is responsible for executing any approved user or application objective enabled by W4 COMN operations or interoperating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e., the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself, while in other embodiments, full access to the IO is possible and RWEs can thus also be extracted by analyzing the content of the object, e.g. strings within an email are extracted and associated as RWEs to for use in determining the relationships between the sender, user, topic or other RWE or IO impacted by the object or process.

In an embodiment, the W4 engine 310 represents a group of applications executing on one or more computing devices that are nodes of the W4 COMN. For the purposes of this disclosure, a computing device is a device that includes a processor and memory for storing data and executing software (e.g., applications) that perform the functions described. Computing devices can be provided with operating systems that allow the execution of software applications in order to manipulate data.

In the embodiment shown, the W4 engine 310 can be one or a group of distributed computing devices, such as a general-purpose personal computers (PCs) or purpose built server computers, connected to the W4 COMN by suitable communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a mass storage device (not shown) that is connected to, or part of, any of the computing devices described herein including the W4 engine 310. For example, in an embodiment, the data backbone of the W4 COMM, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media can comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 4:
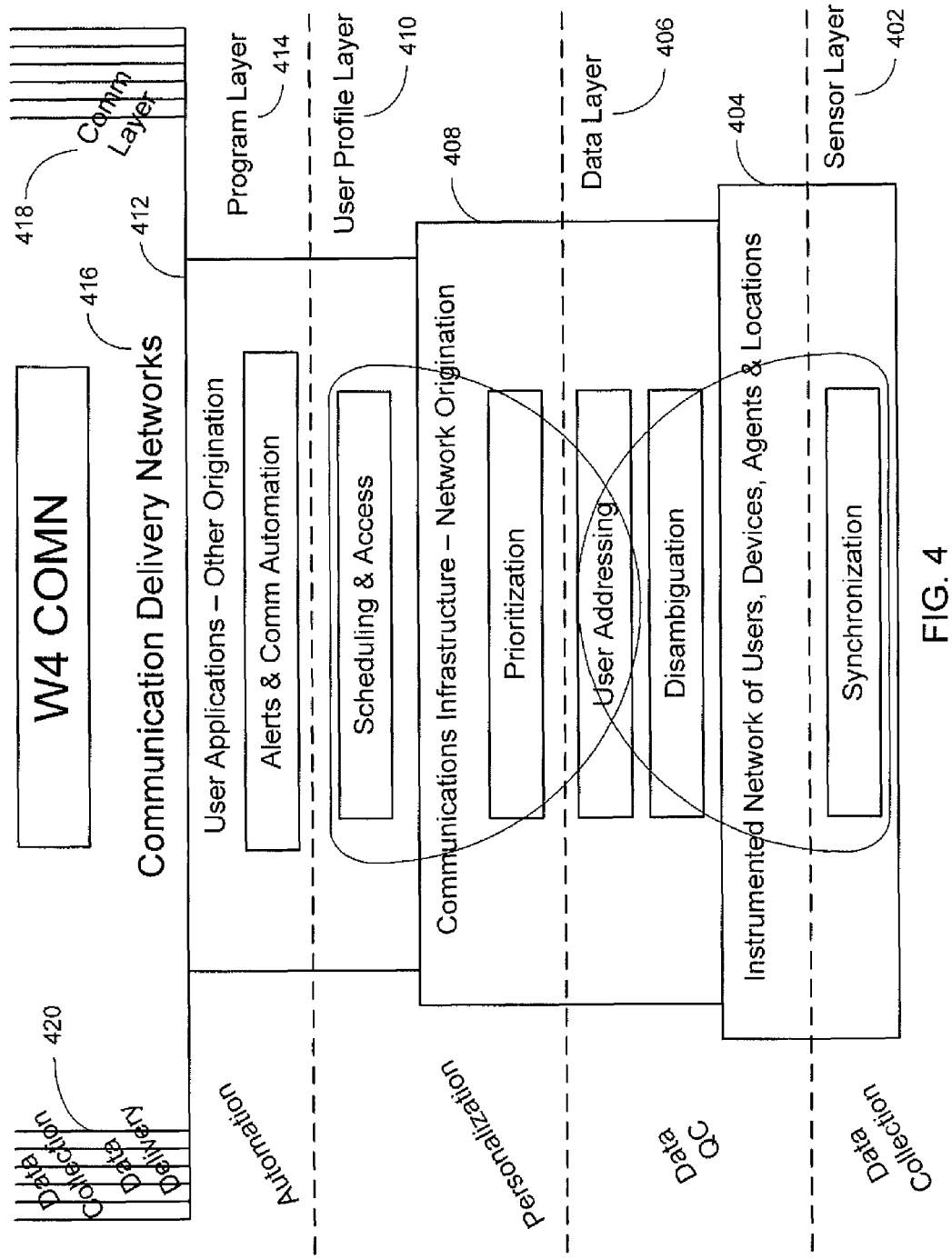
FIG. 4 illustrates the functional layers of the W4 COMN architecture.

FIG. 4 illustrates the functional layers of the W4 COMN architecture. At the lowest layer, referred to as the sensor layer 402, is the network 404 of the actual devices, users, nodes and other RWEs. The instrumentation of the network nodes to utilize them as sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The next layer is the data layer 406 in which the data produced by the sensor layer 402 is stored and cataloged. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The next layer of the W4 COMN is the user profiling layer 410. This layer 410 can further be distributed between the network infrastructure 408 and user applications/processes 412 executing on the W4 engine or disparate user computing devices. The user profiling layer 410 performs the W4 COMN's user profiling functions. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available to all processes of all applications approved on the W4 COMN. All Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from anything other than the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve some role as a sensor in that they, through their actions, generate data back to the data layer 406 via the data backbone concerning any data created or available due to the applications execution.

The applications layer 414 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices.)

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of its regular intersection and sensing by enabled devices in its real-world location.

Above the applications layer 414 (and sometimes hosted within it) is the communications delivery network(s) 416. This can be operated by the W4 COMN operator or be independent third-party carrier service, but in either case it functions to deliver the data via synchronous or asynchronous communication. In every case, the communication delivery network 414 will be sending or receiving data (e.g., http or IP packets) on behalf of a specific application or network infrastructure 408 request.

The communication delivery layer 418 also has elements that act as sensors including W4 entity extraction from phone calls, emails, blogs, etc. as well as specific user commands within the delivery network context, e.g., "save and prioritize this call" said before end of call can trigger a recording of the previous conversation to be saved and for the W4 entities within the conversation to analyzed and increased in weighting prioritization decisions in the personalization/user profiling layer 410.

Figure 5:
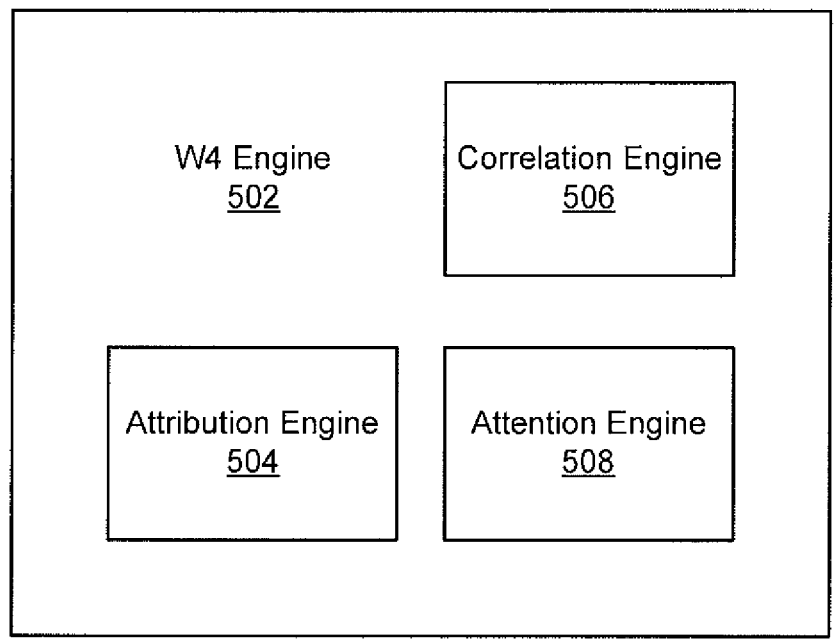
FIG. 5 illustrates an embodiment of analysis components of a W4 engine as shown in FIG. 2.

FIG. 5 illustrates an embodiment of analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is an attribution engine 504. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The W4 engine 502 further includes a correlation engine 506. The correlation engine 506 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data. In this embodiment, a histogram of all RWEs and IOs is created, from which correlations based on the graph can be made. Graphing, or the act of creating a histogram, is a computer science method of identifying a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By selecting each IO, RWE, and other known parameters (e.g., times, dates, locations, etc.) as different bins and mapping the available data, relationships between RWEs, IOs and the other parameters can be identified.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
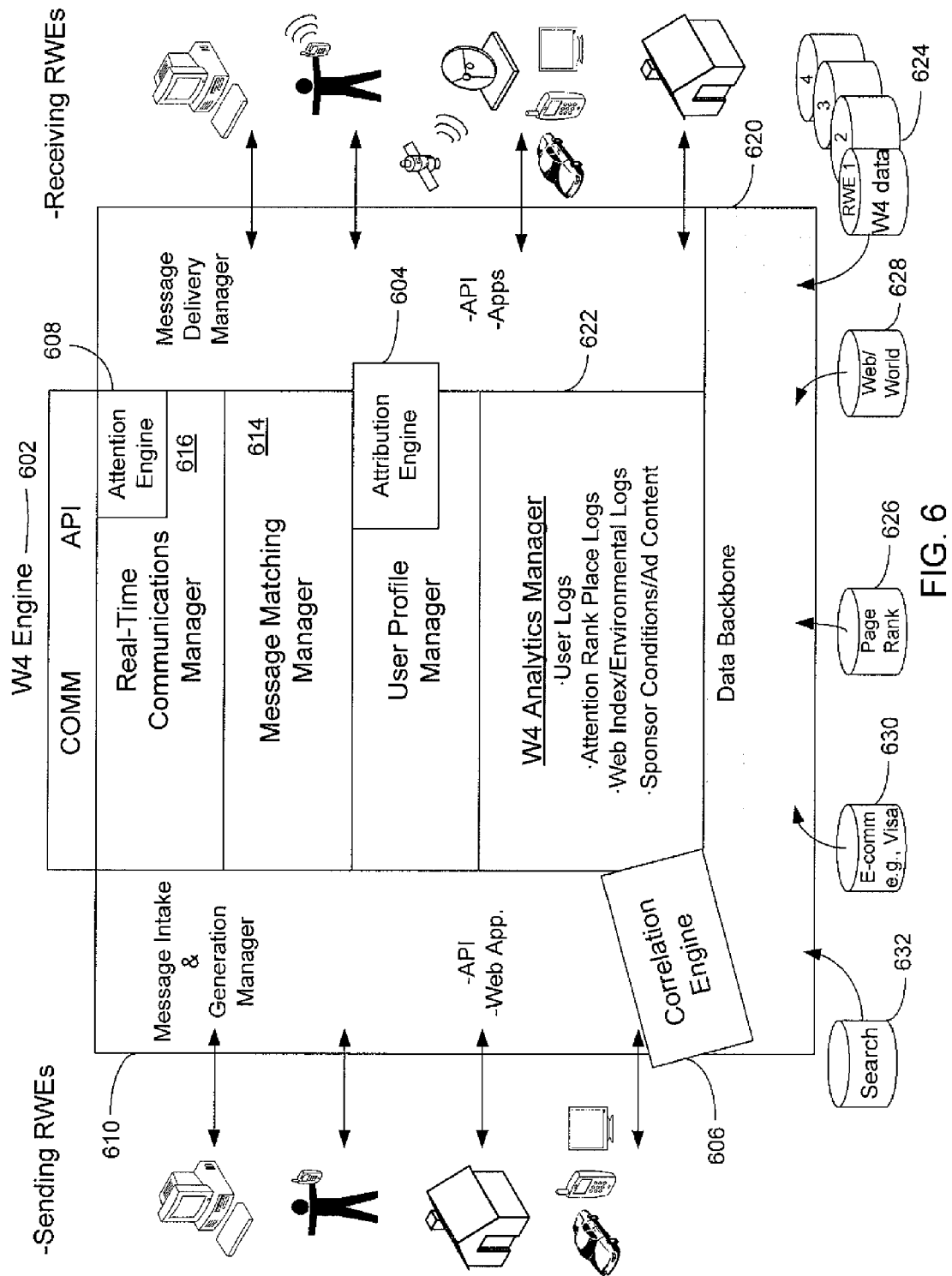
FIG. 6 illustrates an embodiment of a W4 engine showing different components within the sub-engines described generally above with reference to FIG. 5.

FIG. 6 illustrates an embodiment of a W4 engine showing different components within the sub-engines described generally above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622 and includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

The interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower data | Time stamps | Interpersonal |
| GPRS data | Local clock | communication data |
| GPS data | Network clock | Media data |
| WiFi data | User input of | Relationship data |
| Personal area network data | time data | Transactional data |
| Network access points data | | Device interaction data |
| User input of location data | | |
| Geo-coordinates data | | |

With respect to the interaction data, communications between any RWEs can generate communication data that is transferred via the W4 COMN. For example, the communication data can be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data can be correlated with, for example, temporal data to deduce information regarding frequency of communications, including concentrated communication patterns, which can indicate user activity information.

Logical and IO data refers to the data contained by an IO as well as data associated with the IO such as creation time, owner, associated RWEs, when the IO was last accessed, etc. If the IO is a media object, the term media data can be used. Media data can include any data relating to presentable media, such as audio data, visual data, and audiovisual data. For example, the audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device. The audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like. The media data also includes non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. As described in further detail below, media data can be used, for example, to deduce activities information or preferences information, such as cultural and/or buying preferences information.

The relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Point-Of-View Modeling Based on W4 Data

Many of the W4 processes and functions are based on the modeling of relationships between RWEs. In an embodiment, the W4 data are processed and analyzed using data models that treat data not as abstract signals stored in databases, but rather as IOs that represent or contain information about RWEs that actually exist, have existed, or will exist in real space, real time, and are real people, objects, places, times, and/or events. As such, the data model for W4 IOs that represent W4 RWEs (Where/When/Who/What) will model not only the signals recorded from the RWEs or about the RWEs, but also represent these RWEs and their interactions in ways that model the affordances and constraints of entities and activities in the physical world. A notable aspect is the modeling of data about RWEs as embodied and situated in real world contexts so that the computation of similarity, clustering, distance, and inference take into account the states, or state information, and actions of RWEs in the real world and the contexts and patterns of these states and actions.

With appropriate data models for IOs that represent data from or about RWEs, a variety of machine learning techniques can be applied to analyze the W4 data. In an embodiment, W4 data may be modeled as a "feature vector" in which the vector includes not only raw sensed data from or about W4 RWEs, but also higher order features that account for the contextual and periodic patterns of the states and action of W4 RWEs. Each of these features in the feature vector may have a numeric or symbolic value that can be compared for similarity to other numeric or symbolic values in a feature space. Each feature may also be modeled with an additional value from 0 to 1 (a certainty value) to represent the probability that the feature is true. By modeling W4 data about RWEs in ways that account for the affordances and constraints of their context and patterns in the physical world in features and higher order features with or without certainty values, this data (whether represented in feature vectors or by other data modeling techniques) can then be processed to determine similarity, difference, clustering, hierarchical and graph relationships, as well as inferential relationships among the features and feature vectors.

A wide variety of statistical and machine learning techniques can be applied to W4 data from simple histograms to Sparse Factor Analysis (SFA), Hidden Markov Models (HMMs), Support Vector Machines (SVMs), Bayesian Methods, etc. Such learning algorithms may be populated with data models that contain features and higher order features represent not just the "content" of the signals stored as IOs, e.g., the raw W4 data, but also model the contexts and patterns of the RWEs that exist, have existed, or will exist in the physical world from which these data have been captured.

One aspect of the W4 COMN is the ability to identify relationships between RWEs that are different depending upon the point-of-view (POV) from which the relationship is considered, such as for example a father-son relationship between two people or a master-slave relationship between two devices. POV relationships are useful to the W4 COMN as in many cases the identification of relationships is made relative to a specific POV of an RWE. For example, the W4 COMN may generate a histogram from the W4 data representing a first user's interaction with the world of known RWEs to determine which RWEs are relevant and important to the user. Such an analysis is inherently POV oriented as, for example, an email from a first user discussing the first user's opinions about another known RWE or a transaction record that the first user made a purchase at an RWE provide different information depending on the POV of each RWE.

While it is true that many types of relationships are symmetrical and that the relationship is the same between each related entity (e.g. friendship) in many cases relationships are different depending on the point of view from which the relationship is considered. As mentioned above, the parent-child relationship is a classic example of a relationship between two people, in which depending on the point of view the relationship is different. The W4 COMN tracks these relationships by allowing for a point of view modeling system when defining relationships for RWEs. In an embodiment, for each RWE known to the system, one or more information objects may be created in order to describe that RWE. In essence, such an IO is the data that represents the RWE to the W4 COMN. Such an IO will be referred to as an entity IO in order to distinguish it from other IOs which contain data representing things such as communications and other data on the W4 COMN. In an embodiment, an entity IO will contain such information as the unique identifier for the RWE, other information known about the RWE such as what type of entity it is (e.g. whether it is a location, person, device, event, etc.). In addition, an entity IO may include a listing of known proxies for the entity as well as a listing of RWEs that the subject RWE is a proxy for. For example, an entity IO for a person "John Smith" may include such information as Mr. Smith's unique W4 identifier, a listing of Mr. Smith's known devices based on correlations of W4 data, for example Mr. Smith's cell phone, Mr. Smith's laptop computer, Mr. Smith's car, Mr. Smith's home telephone, etc. In addition, Mr. Smith's entity IO may include a listing of user accounts such as email accounts, log-ins, accounts at different social networking pages, WebPages, etc. which are known to be associated with or proxies for Mr. Smith on the network. Such an entity IO may further include such information as explicit information provided by Mr. Smith, either directly to the W4 COMN or via one of Mr. Smith's proxy RWEs or proxy IOs. It should be noted that in an alternative embodiment, information in an entity IO may be stored in the IO, or alternatively, the entity IO may contain pointers directly to other IOs that contain the information.

One aspect of point of view modeling is to identify relationships that are point of view relationships in an entity IO. In an embodiment, depending upon the type of RWE (e.g. person, location, business, etc.) certain standard point of view relationships may be accounted for within the entity IO. For example, for every RWE that is a person, it is presumed that that person will generally have a father and a mother, and that therefore there are two other RWEs which may or may not be known to the system and may or may not be identifiable based on those RWE's interaction with the system, but which the system explicitly knows will exist. In addition, W4 COMN will know that the relationship between the given user and the user's parents will be point of view relationships, and the entity IO for every user may include data elements reserved for information identifying the father IO and the mother IO. Likewise data elements may be provided for children, for spouses and for other potential point of view relationships that can be reasonably attributed to every person who may be identified by the system. Other entity types may also have anticipated or expected point of view relationships. For example, a businesses may have an employer-employee relationship with its employees, and thus entity IOs for businesses may be provided with data elements specifically for that point of view relationship. Depending on the type of business there may be directors, shareholders, and other potential point of view relationships associated within the entity IO.

As discussed above, relationships may be identified either explicitly or implicitly from an analysis of the W4 data. An explicit declaration of a relationship refers to, for example, a specific user identifying another user as being related in a specific manner. For example, when providing background information at the request of the W4 COMN or some other communication channel (e.g. when setting up an account) a new user may identify members of the family and the exact relationship of those members. This is considered explicit identification of a relationship. If that relationship is a point of view relationship, then this information may be stored into an entity IO for that entity. Furthermore, if the other entities with whom the first entity has a relationship are known to the system, their entity IOs may also be updated to identify the relationship. Such an updating may be performed automatically and will be performed on the basis of the point of view relationship. In many cases, if the point of view relationship is known from the point of view of one party, the reciprocal point of view relationship from the point of view of the other party is explicitly defined and can be automatically added to the other party's entity IO. For example, if a first user identifies a second user as his son, then the system can return and identify the first user as the father of the second user automatically. Such reciprocal identifications may be performed automatically, may be performed by notifying the second user in order to obtain a verification of this explicit identification, or the reciprocal point of view relationship may be ignored until there is an explicit identification received from the second user.

In the absence of an explicit identification of a point of view relationship based on correlations identified by the W4 COMN and other relationships identified from an analysis of the W4 data, point of view relationships may be determined to a high degree of probability and even explicitly determined from communications that are not themselves explicit declarations to the W4 COMN. For example, a first user may send an email to a second user via the W4 COMN in which the salutation "Dear Dad" or "Dear Father" is provided. Based on one or more detections of this salutation or version of similar salutations which indicate that the second user is the father of the first user it may be determined by the modeling used in the W4 analysis of the W4 data to a high probability that the second user is the father of the first user. Other examples of such actions detected by the W4 COMN which may be considered to imply a point of view relationship include such things as purchases and communications and transmissions sent on holidays associated with point of view transmissions such as Secretaries Day, Mothers Day, Fathers Day, etc. In addition the content of various communications such as the content of an email as described above may be inspected and analyzed in order to identify point of view relationships.

Figure 7:
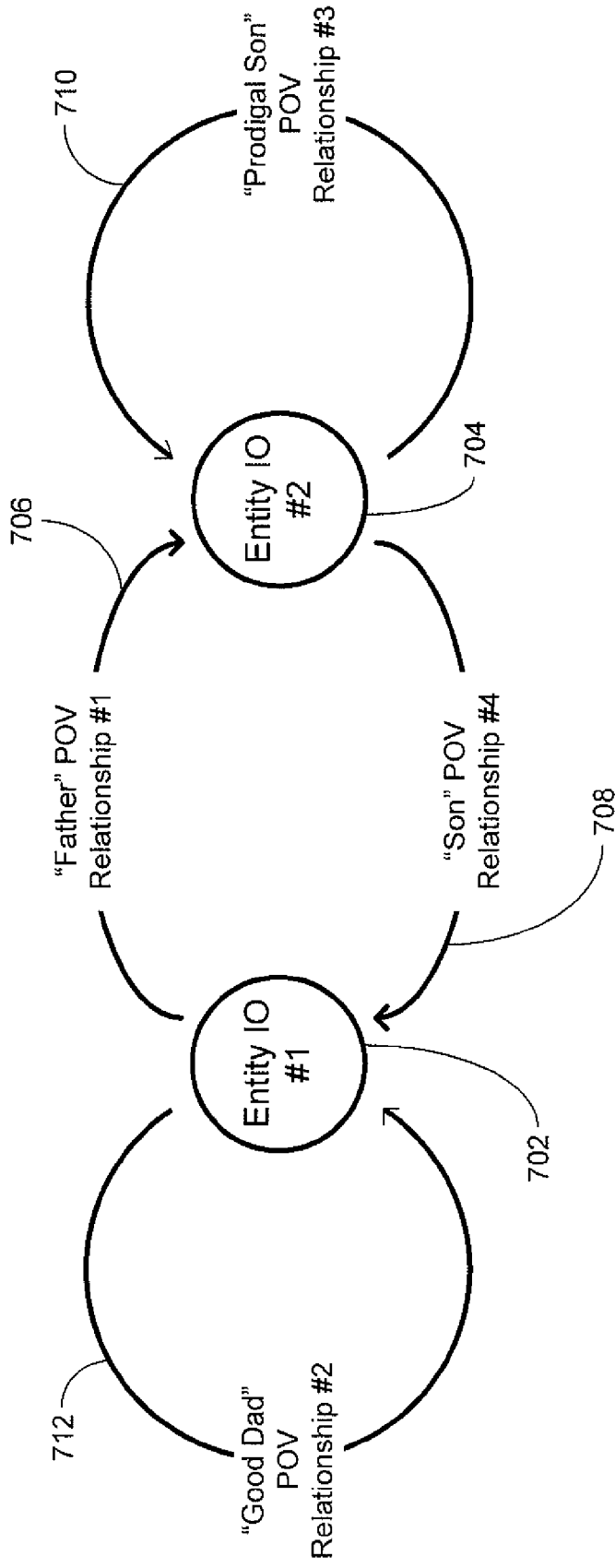
FIG. 7 illustrates a conceptual representation of point-of-view relationships between entity IOs.

FIG. 7 illustrates a conceptual embodiment of relationships between entity IOs. FIG. 7 illustrates two IOs, 702, 704. The first IO 702 is an entity IO representing a first RWE, such as for example, a user. The second IO 704 represents another entity ID, such as for example, another user. In the embodiment illustrated, entity IO number one has a point of view relationship with entity IO number one as illustrated by the arrow 706. Such an entity relationship may be that entity IO number two represented by IO 704 is the father of entity IO number one represented by the IO 702. Likewise there is a reciprocal relationship 708 illustrated by the line 708 which in this case illustrates that from the perspective of entity IO number two, entity IO number two is the son of entity IO number one. Two other relationships are illustrated by two arrows 710 and 712. These are point of view relationships in which the entity provides the entities own perception of itself. For example, the first entity may consider itself to be a good father or a mountain biker, or a good boss, or a good driver, or a resource for people in a specific industry. This is illustrated by the arrow 712. By defining a point of view relationship in which an entity's own point of view itself can be defined, it is possible to allow entities to provide additional information about themselves. However, by defining such information as a point of view relationship of itself, the system can then obtain additional information based on other relationship information derived from other sources and verify or support an entity's view of itself. FIG. 7 illustrates a simple embodiment that includes only two entities. A more complicated embodiment in which each entity is related by multiple point of view relationships to many other entities within a network creates a mode and link model that can be easily searched and used for data mining.

Figure 8:
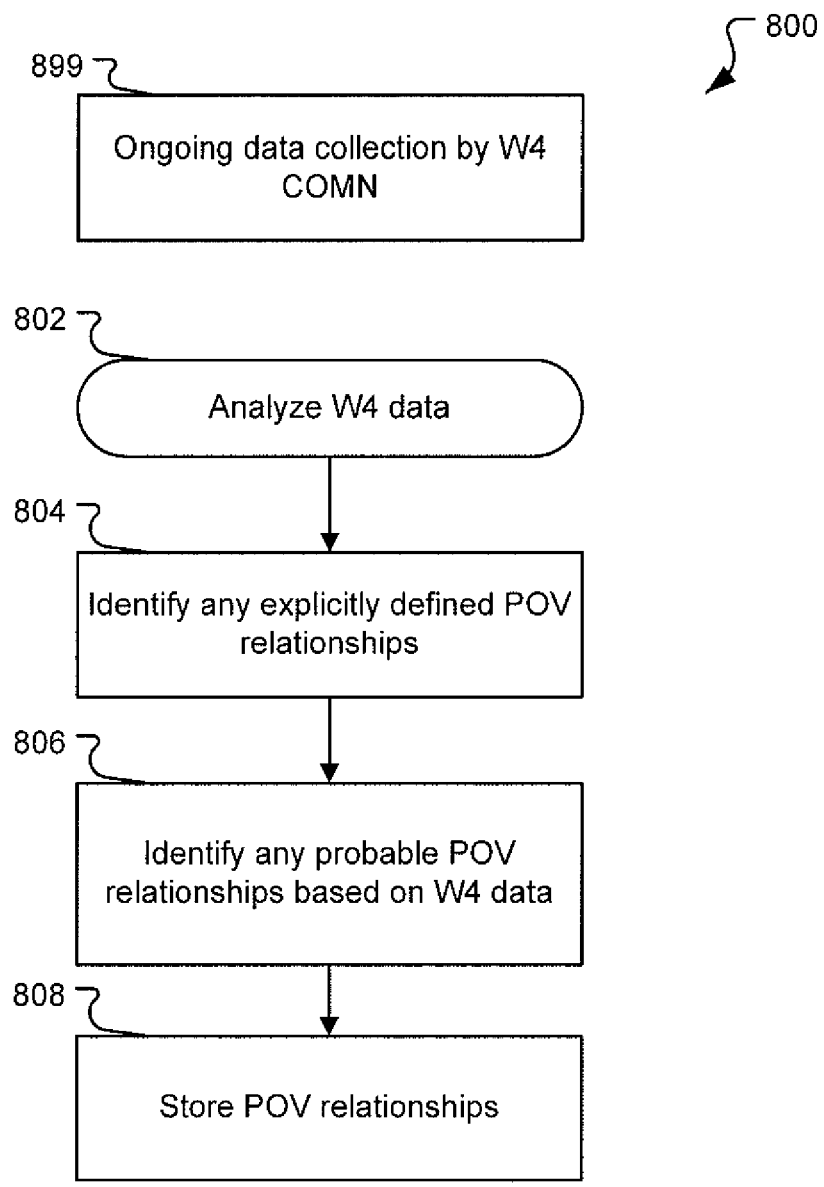
FIG. 8 illustrates an embodiment of a method for storing information objects containing data derived from communications over disparate communication channels.

FIG. 8 illustrates an embodiment of a method for modeling relationships based on an analysis of data contained in communications transmitted via different communication channels using social, temporal, spatial and topical data for entities on a network. In the embodiment described below, depending on how the architecture is implemented, the operations described can be performed by one or more of the various engines described above. In addition, sub-engines can be created and used to perform specific operations in order to improve the network's performance or provide specific POV-related services.

As described above, an aspect of the W4 COMN that allows for data optimization is the ongoing collection of W4 data from the RWEs interacting with the network. In an embodiment, this collection is an independent operation 899 of the W4 COMN and thus current W4 social, temporal, spatial and topical data are always available for use in data optimization. In addition, part of this data collection operation 899 includes the determination of ownership and the association of different RWEs with different IOs as described above, as well as the identification of new RWEs when they first interact with the W4 COMN. Therefore, each IO is owned/controlled by at least one RWE with a known unique identifier on the W4 COMN, and each IO can have many other associations with other RWEs that are known to the W4 COMN.

Provided with the W4 data that was collected in the data collection operation 899, the method 800 starts with an analysis of the W4 data in order to identify relationships. Examples of modeling techniques and other analytical techniques that could be used for analyzing the W4 data in order to identify relationships and potential relationships has been discussed above. The results of the analysis may include a histogram or other data structures that represent an RWE's relationship with all of the other known RWEs in the system or a subset of other known RWEs in the system. Such an analysis as described above is inherently point of view oriented in that it is from the point of view of one RWE to all of the other RWEs known in the network.

After the analysis operation 802 any explicitly defined point of view relationships are identified in a first identification operation 804. This operation may be done at the same time the W4 data is analyzed, or before or after that operation 802. The first identification operation 804 may include retrieving known explicit point of view relationships from an entity IO or may include conducting a real time search of the W4 data at the time the method 800 is performed in order to collect any new explicit declarations of point of view relationships. A second identification operation is also performed in which the results of the analysis operation 802 are used in order to identify a probability score for any probable point of view relationships based on the W4 data. For example, as described above, if a first user has transmitted a number of communications to a second user in which the salutation "Dear Father" or "Dear Dad" is used, then the second identification operation 806 may, based on this information, generate a probability score according to a predefined algorithm which attempts to quantify the likelihood that the recipient of the emails is the father of the sender of the emails. Such a probability score may then be compared to a threshold, and if it exceeds the threshold, the assumption may be made that a point of view relationship exists between the two entities and that the point of view relationship is that the sender is the son and the recipient is the father. If the probability score is not high enough the system may issue a request to clarify the nature of the relationship or may optionally do nothing and not identify any relationship other than that there has been contact between two people of a general nature. In the embodiment shown, a storage operation 808 is performed in which the entity IO is updated based on any newly identified explicit point of view relationships and any probable point of view relationships identified in a second identification operation 806. These point of view relationships are then used in the data modeling of the W4 data.

In an embodiment, the method 800 is done as part of the general W4 modeling of data in order to identify relationships, and thus may be considered a subset of the entire process of modeling relationships by the W4 COMN. The resulting data structures will represent the relationships as shown in FIG. 7 and allow additional analysis and relationships to be generated based on this information.

Figure 9:
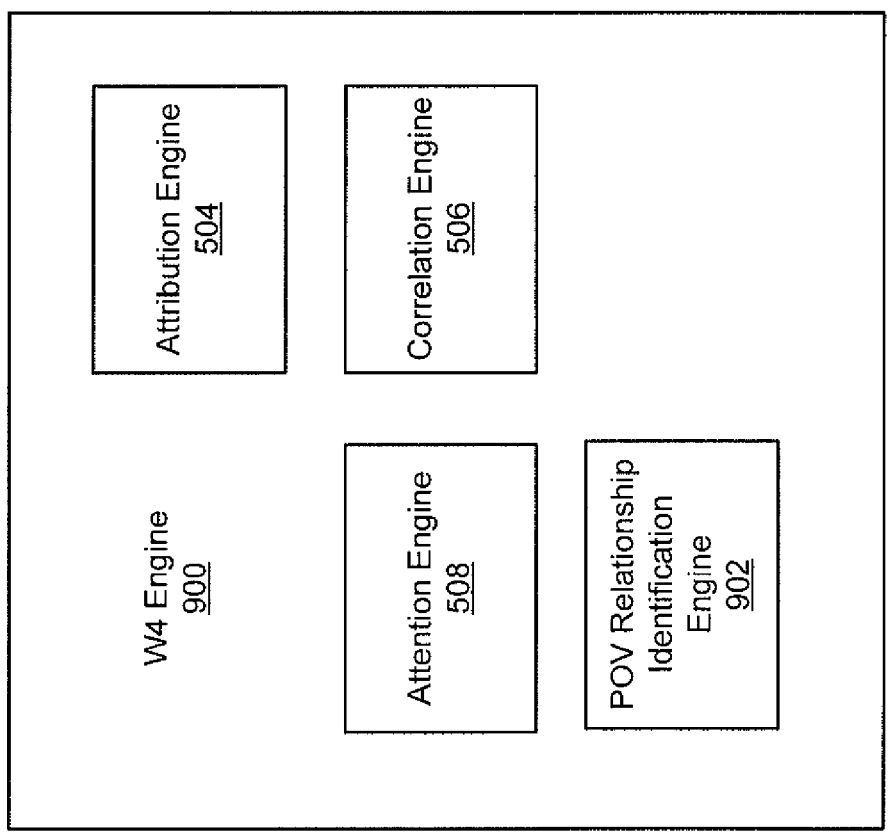
FIG. 9 illustrates some of the elements in a W4 engine adapted to optimize the storage of data derived from communications over disparate communication channels.

FIG. 9 illustrates some of the elements in a W4 engine adapted to perform W4 data optimization as described herein. The W4 engine 900 includes a correlation engine 506, an attribution engine 504 and an attention engine 508 as described above. In addition, the W4 engine illustrates a POV relationship identification engine 902. The POV relationship identification engine 902 identifies relationships which are POV relationships by inspecting explicit data provided by each RWE and by making determinations based on probabilistic analyses of W4 data that imply POV relationships based on analyses the correlations made by the correlation engine 506. Upon determination that a POV relationship exists, the POV relationship identification engine 902 stores information in the appropriate IOs that represent RWEs associated with the relationship.

Figure 10:
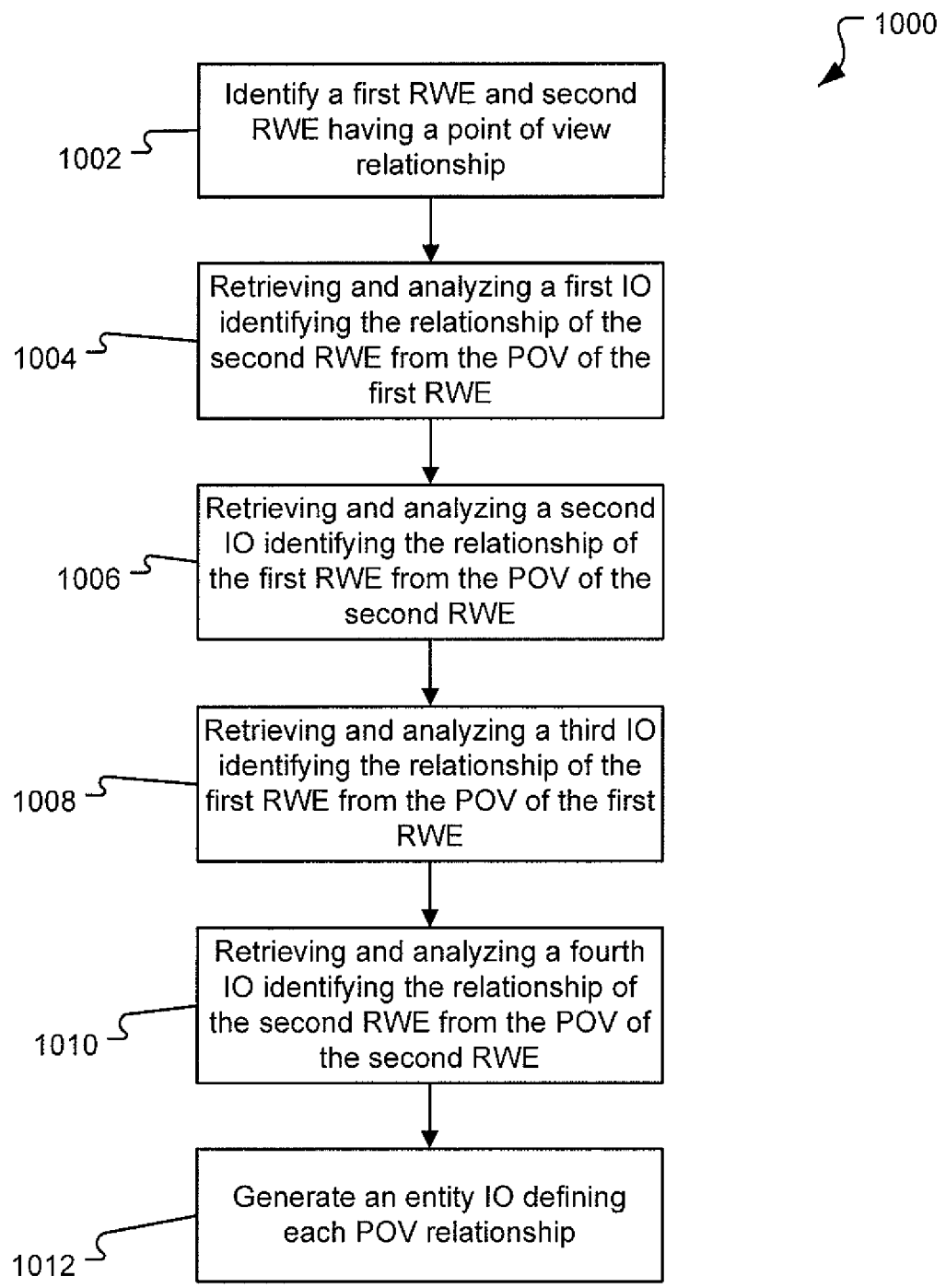
FIG. 10 illustrates an embodiment of a method for identifying, storing and using point of view relationships

FIG. 10 illustrates an embodiment of a method for identifying, storing and using point of view relationships 1000. In the embodiment shown, the FIG. 10 begins with an identification operation 1002 in which a first RWE and a second RWE are identified that have at least one point of view relationship between the two. In the example illustrated herein, the nature of the relationships match those illustrated in FIG. 7. The relationships which are identified by the first and second entity IOs may be determined through an analysis of the W4 data as described above or may also be determined through explicit declarations known to the W4 COMN. The rest of the identification operation equally applies to explicit declarations of point of view relationships and implicit identifications of point of view relationships developed based on a probability score.

A retrieval and analysis operation 1004 is performed whenever information identifying the relationship of the second RWE from the point of view of the first RWE is necessary. In this embodiment, such a relationship may be necessary when determining the first RWE's entire list of relationships, for example when a W4 analysis in correlation has to be performed from the first RWE's point of view. Another retrieval and analysis operation 1006 is also shown in which the information identifying a relationship of the first RWE from the point of view of the second RWE is necessary. Again such analysis may be performed when an analysis of the second RWE's relationship with all of the other RWEs known to the system is necessary. This illustrates that this point of view relationship is managed and stored independently from the prior point of view relationship (i.e. that of the second RWE from the point of view of the first).

Likewise, a third retrieval and analysis operation 1008 is provided, wherein from a third information object may be retrieved as necessary that identifies the relationship of the first RWE from the point of view of the first RWE, thus, in situations where it is necessary to determine what the first RWE's self declared relationship is or self declared description will be retrieved in this operation 1008. Similarly, a fourth operate retrieval and analysis operation 1010 is shown in which from a fourth information object or data element information may be retrieved and analyzed whenever it is necessary to determine the second RWE's relationship from the point of view of the second RWE.

After the RWEs have been identified and analyzed, a generation operation 1012 generates either an information object or a new data element (i.e., entity IO) that defines each point of view relationship identified in the identification operation 1002. In this embodiment and alternate embodiments, a separate information object may be generated in order to store the point of view relationship, or a data element in a previously existing information object such as an entity object is added or updated to contain information identifying a point of view relationship. In operation, the alternative embodiments may be indistinguishable and selection of either may be based on other implementation concerns such as the amount of data used, how it was accessed, and the number of information objects created by the system.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure. Numerous other changes can be made that will readily suggest themselves to those skilled in the art and which are encompassed in the spirit of the disclosure and as defined in the appended claims.

What is claimed is:

1. A method comprising:
    identifying, via a computing device, a first real world entity (RWE) and a second RWE having at least one relationship;
    identifying, via the computing device, a first information object (IO) associated with the first RWE that defines a state of the first RWE, and a second information object associated with the first RWE that defines a state of a second RWE from a perspective of the first RWE;
    identifying, via the computing device, a third information object associated with the second RWE that defines a state of the second RWE;
    identifying, via the computing device, a fourth information object associated with the second RWE that defines a state of the first RWE from a perspective of the second RWE; and
    generating, via the computing device, an entity information object based on the first, second, third and fourth information objects, the generated entity information object defining a point-of-view (POV) relationship between each of the information objects associated with the first RWE and the second RWE.

2. The method of claim 1, further comprising:
    storing, via the computing device, the POV relationship based upon a respective perspective of the first RWE to the second RWE and the second RWE to the first RWE.

3. The method of claim 1, further comprising:
    modeling, via the computing device, known interactions between the first RWE and the second RWE; and
    determining, via the computing device, whether the interactions represent an implicit or explicit POV relationship between the first and second RWEs.

4. The method of claim 3, further comprising:
    identifying, via the computing device, the POV relationship as explicit when the POV relationship between the first RWE and the second RWE is based upon an explicit declaration of the POV relationship by at least one of the first RWE and the second RWE.

5. The method of claim 3, further comprising:
    identifying, via the computing device, the POV relationship as implicit based on implicit interactions between the first and second RWEs.

6. The method of claim 3, wherein the modeling comprises a probability analysis of data contained in electronic communications between the first RWE and the second RWE.

7. The method of claim 3, wherein the modeling comprises analysis of content of electronic communications between the first RWE and the second RWE.

8. The method of claim 1, wherein the entity information object comprises descriptors and identifiers for the first RWE and the second RWE.

9. The method of claim 1, further comprising:
    determining, via the computing device, the POV relationship as an implicit relationship based upon stored social data, spatial data, temporal data and logical data of the first RWE and the second RWE and each of the information objects associated with the first RWE and second RWE.

10. The method of claim 1, further comprising storing each POV relationship independently.

11. A non-transitory computer-readable storage medium tangibly encoded with computer-executable instructions, that when executed by a computing device, perform a method comprising:
    identifying a first real world entity (RWE) and a second RWE having at least one relationship;
    identifying a first information object (IO) associated with the first RWE that defines a state of the first RWE, and a second information object associated with the first RWE that defines a state of a second RWE from a perspective of the first RWE;
    identifying a third information object associated with the second RWE that defines a state of the second RWE;
    identifying a fourth information object associated with the second RWE that defines a state of the first RWE from a perspective of the second RWE; and
    generating an entity information object based on the first, second, third and fourth information objects, the generated entity information object defining a point-of-view (POV) relationship between each of the information objects associated with the first RWE and the second RWE.

12. The non-transitory computer-readable storage medium of claim 11, further comprising:
    storing the POV relationship based upon a respective perspective of the first RWE to the second RWE and the second RWE to the first RWE.

13. The non-transitory computer-readable storage medium of claim 11, further comprising:
  modeling known interactions between the first RWE and the second RWE; and
  determining whether the interactions represent an implicit or explicit POV relationship between the first and second RWEs.

14. The non-transitory computer-readable storage medium of claim 13, further comprising:
  identifying the POV relationship as explicit when the POV relationship between the first RWE and the second RWE is based upon an explicit declaration of the POV relationship by at least one of the first RWE and the second RWE.

15. The non-transitory computer-readable storage medium of claim 13, further comprising:
  identifying the POV relationship as implicit based on implicit interactions between the first and second RWEs.

16. The non-transitory computer-readable storage medium of claim 13, wherein the modeling comprises a probability analysis of data contained in electronic communications between the first RWE and the second RWE.

17. The non-transitory computer-readable storage medium of claim 13, wherein the modeling comprises analysis of content of electronic communications between the first RWE and the second RWE.

18. The non-transitory computer-readable storage medium of claim 11, further comprising:
  determining the POV relationship as an implicit relationship based upon stored social data, spatial data, temporal data and logical data of the first RWE and the second RWE and each of the information objects associated with the first RWE and second RWE.

19. A system comprising:
  a processor;
  a non-transitory computer-readable storage medium for tangibly storing thereon program logic for execution by the processor, the program logic comprising:
    identification logic executed by the processor for identifying a first real world entity (RWE) and a second RWE having at least one relationship;
    identification logic executed by the processor for identifying a first information object (IO) associated with the first RWE that defines a state of the first RWE, and a second information object associated with the first RWE that defines a state of a second RWE from a perspective of the first RWE;
    identification logic executed by the processor for identifying a third information object associated with the second RWE that defines a state of the second RWE;
    identification logic executed by the processor for identifying a fourth information object associated with the second RWE that defines a state of the first RWE from a perspective of the second RWE; and
    generation logic executed by the processor for generating an entity information object based on the first, second, third and fourth information objects, the generated entity information object defining a point-of-view (POV) relationship between each of the information objects associated with the first RWE and the second RWE.

20. The system of claim 19, further comprising:

modelling logic executed by the processor for modeling known interactions between the first RWE and the second RWE;

determination logic executed by the processor for determining whether the interactions represent an implicit or explicit POV relationship between the first and second RWEs;

identification logic executed by the processor for identifying the POV relationship as explicit when the POV relationship between the first RWE and the second RWE is based upon an explicit declaration of the POV relationship by at least one of the first RWE and the second RWE; and identification logic executed by the processor for identifying the POV relationship as implicit based on implicit interactions between the first and second RWEs.

* * * * *